US012731092B1

(12) United States Patent
Richards et al.

(10) Patent No.: US 12,731,092 B1
(45) Date of Patent: Sep. 8, 2026

(54) SYSTEMS AND METHODS FOR STATE MACHINE MANAGEMENT

(71) Applicant: Palantir Technologies Inc., Aventura, FL (US)

(72) Inventors: Kevin Richards, San Francisco, CA (US); Arseny Bogomolov, Arlington, VA (US); Grigory Bonik, Palo Alto, CA (US); Victor Hsu, Palo Alto, CA (US); Alexander Visbal, San Francisco, CA (US); John Carrino, Redwood City, CA (US); Cooper Bills, Fremont, CA (US); Diran Li, Palo Alto, CA (US); William Rhyne, Arlington, VA (US); Timothy O'Brien, Washington, DC (US); Matthew Bango, Palo Alto, CA (US)

(73) Assignee: Palantir Technologies Inc., Aventura, FL (US)

(*) Notice: Subject to any disclaimer, the term of this patent is extended or adjusted under 35 U.S.C. 154(b) by 390 days.

(21) Appl. No.: 18/145,252

(22) Filed: Dec. 22, 2022

Related U.S. Application Data

(63) Continuation of application No. 15/097,842, filed on Apr. 13, 2016, now Pat. No. 11,580,472.

(Continued)

(51) Int. Cl.
*G06Q 10/0631* (2023.01)
*G06F 16/93* (2019.01)

(Continued)

(52) U.S. Cl.
CPC ....... *G06Q 10/06316* (2013.01); *G06F 16/93* (2019.01); *G06Q 10/06* (2013.01); *G06Q 10/103* (2013.01); *G06Q 50/18* (2013.01)

(58) Field of Classification Search
None
See application file for complete search history.

(56) References Cited

U.S. PATENT DOCUMENTS

| | | | |
|---|---|---|---|
| 8,346,729 | B2 | 1/2013 | Brannon |
| 8,548,967 | B1 | 10/2013 | Poole |

(Continued)

FOREIGN PATENT DOCUMENTS

| | | | |
|---|---|---|---|
| EP | 3093809 | A1 | 11/2016 |
| EP | 3188051 | A1 | 7/2017 |
| EP | 3572995 | A1 | 11/2019 |

OTHER PUBLICATIONS

Herbst, Joachim, and Dimitris Karagiannis. "Integrating machine learning and workflow management to support acquisition and adaptation of workflow models." Intelligent Systems in Accounting, Finance & Management 9.2 (2000): 67-92 (Year: 2000).*

(Continued)

*Primary Examiner* — Darlene Garcia-Guerra
(74) *Attorney, Agent, or Firm* — Faegre Drinker Biddle & Reath LLP

(57) ABSTRACT

A case management system is configured to provide one or more case generation and management functions. As configured, the case management system enables a user to define a workflow, the workflow including one or more states, one or more operations which may be performed at the one or more states, and one or more transitions corresponding to the operations and defining a sequence of the states; to generate and configure a state machine; to receive a workflow identifier to assign to the state machine; and through a command received from a client device, to open and manage a case based on the configuration of the state machine.

15 Claims, 9 Drawing Sheets

Related U.S. Application Data

(60) Provisional application No. 62/161,746, filed on May 14, 2015.

(51) Int. Cl.

| | |
|---|---|
| ***G06Q 10/06*** | (2023.01) |
| ***G06Q 10/10*** | (2023.01) |
| ***G06Q 50/18*** | (2012.01) |

(56) References Cited

U.S. PATENT DOCUMENTS

| | | | | |
|---|---|---|---|---|
| 8,639,555 | B1 | 1/2014 | Johnston | |
| 8,725,549 | B2 | 5/2014 | Arroyo | |
| 8,818,783 | B2 * | 8/2014 | Novaes | G06F 13/10 703/13 |
| 9,600,766 | B2 | 3/2017 | Challenger | |
| 9,665,893 | B2 * | 5/2017 | Gorur | G06Q 30/06 |
| 9,852,220 | B1 | 12/2017 | Guo | |
| 10,698,767 | B1 * | 6/2020 | De Kadt | G06F 16/2315 |
| 11,580,472 | B2 | 2/2023 | Richards et al. | |
| 2002/0133395 | A1 | 9/2002 | Hughes | |
| 2002/0152102 | A1 * | 10/2002 | Brodersen | G05B 19/045 705/7.11 |
| 2002/0178252 | A1 | 11/2002 | Balabhadrapatruni | |
| 2003/0050813 | A1 * | 3/2003 | Cohen | G06Q 10/10 705/500 |
| 2003/0074090 | A1 | 4/2003 | Becka | |
| 2003/0153991 | A1 | 8/2003 | Visser | |
| 2004/0003355 | A1 | 1/2004 | DenBraber | |
| 2004/0073565 | A1 | 4/2004 | Kaufman et al. | |
| 2004/0133876 | A1 | 7/2004 | Sproule | |
| 2004/0151294 | A1 | 8/2004 | Baniak | |
| 2004/0172445 | A1 | 9/2004 | Singh | |
| 2004/0205572 | A1 | 10/2004 | Fields | |
| 2005/0043982 | A1 | 2/2005 | Nguyen | |
| 2005/0131750 | A1 | 6/2005 | Kogan | |
| 2005/0132048 | A1 | 6/2005 | Kogan | |
| 2005/0240569 | A1 | 10/2005 | Cheng et al. | |
| 2007/0073674 | A1 | 3/2007 | McVeigh | |
| 2007/0094248 | A1 | 4/2007 | McVeigh et al. | |
| 2007/0112829 | A1 | 5/2007 | Sanabria | |
| 2007/0192715 | A1 | 8/2007 | Kataria | |
| 2007/0276714 | A1 | 11/2007 | Beringer | |
| 2008/0229276 | A1 | 9/2008 | Koehler | |
| 2008/0295101 | A1 | 11/2008 | Vicars | |
| 2009/0077217 | A1 | 3/2009 | McFarland | |
| 2009/0259628 | A1 | 10/2009 | Farrell et al. | |
| 2009/0320088 | A1 | 12/2009 | Gill | |
| 2010/0205616 | A1 | 8/2010 | Lai | |
| 2010/0235841 | A1 | 9/2010 | Sato | |
| 2010/0250731 | A1 | 9/2010 | Xiao | |
| 2010/0306020 | A1 | 12/2010 | Lo | |
| 2011/0103566 | A1 | 5/2011 | Sarkar | |
| 2011/0302132 | A1 | 12/2011 | Muthuvelu | |
| 2011/0307454 | A1 | 12/2011 | Ching | |
| 2012/0060156 | A1 | 3/2012 | Keys | |
| 2012/0151272 | A1 | 6/2012 | Behrendt | |
| 2012/0166206 | A1 * | 6/2012 | Feely | G06Q 10/10 705/1.1 |
| 2012/0259746 | A1 | 10/2012 | Groom | |
| 2012/0331472 | A1 | 12/2012 | Moon | |
| 2013/0311386 | A1 * | 11/2013 | Tehranchi | G06F 16/93 705/317 |
| 2014/0006972 | A1 | 1/2014 | Celkonas | |
| 2014/0046926 | A1 | 2/2014 | Walton | |
| 2014/0180703 | A1 * | 6/2014 | Mansker | G16H 30/00 705/2 |
| 2014/0279776 | A1 | 9/2014 | Brown | |
| 2015/0012057 | A1 | 1/2015 | Carlson | |
| 2015/0012116 | A1 | 1/2015 | Wedl | |
| 2015/0081873 | A1 * | 3/2015 | Stein | G06Q 10/0631 709/223 |
| 2015/0127412 | A1 * | 5/2015 | Kothandaraman | G06Q 30/0635 705/7.26 |
| 2015/0134633 | A1 | 5/2015 | Colgrove et al. | |
| 2015/0193706 | A1 | 7/2015 | Iwasaki | |
| 2015/0310005 | A1 | 10/2015 | Ryger et al. | |
| 2015/0370540 | A1 * | 12/2015 | Coslovi | G06Q 10/0633 717/121 |
| 2016/0124955 | A1 | 5/2016 | Nguyen et al. | |
| 2016/0188789 | A1 | 6/2016 | Kisiel | |
| 2016/0217530 | A1 | 7/2016 | Hashim | |
| 2017/0048285 | A1 | 2/2017 | Pearl | |
| 2017/0085445 | A1 | 3/2017 | Layman | |
| 2017/0193061 | A1 | 7/2017 | Visbal et al. | |

OTHER PUBLICATIONS

Sánchez, Mario, Jorge Villalobos, and Daniel Romero. "A state machine based coordination model applied to workflow applications." Avances en Sistemas e Informática 6.1 (2009): 35-44 (Year: 2009).*

Stavenko, Yulia, Nikolay Kazantsev, and Alexander Gromoff. "Business process model reasoning: From workflow to case management." Procedia Technology 9 (2013): 806-811 (Year: 2013).*

"U.S. Appl. No. 13/196,788, Notice of Allowance mailed Dec. 18, 2015", 17 pgs.

"U.S. Appl. No. 13/826,228, Notice of Allowance mailed Mar. 27, 2015", 10 pgs.

"U.S. Appl. No. 15/167,652, Final Office Action mailed May 11, 2017", 30 pgs.

"U.S. Appl. No. 15/167,652, First Action Interview—Office Action and Examiner Interview Summary mailed Oct. 26, 2016", 5 pgs.

"U.S. Appl. No. 15/167,652, Non Final Office Action mailed Sep. 21, 2017", 37 pgs.

"European Application Serial No. 16207221.9, Extended European Search Report mailed May 30, 2017", 7 pgs.

"European Application Serial No. 16169684.4, Communication Pursuant to Article 94(3) EPC mailed Jan. 31, 2018", 4 pgs.

"European Application Serial No. 19182254.3, Extended European Search Report mailed Oct. 1, 2019", 7 pgs.

"European Application Serial No. 19182254.3, Response filed May 27, 2020 to Extended European Search Report mailed Oct. 1, 2019", 12 pgs.

Sanchez, Mario, "A state machine based coordination model applied to workflow applications" Avances en Sistermas e Informatica 6.1 (2009): 35-44.

Zantout, Hind, "Document management systems from current capabilities towards intelligent information revival: an overview." International Journal of Information Management 19.6 (1999) 471-484.

Georgakopoulos, Diimitrios, "An overview of workflow management: From process modeling to workflow automation infrastructure." Distributed and parallel Databases 3.2 (1995), 119-153.

* cited by examiner

ADMIN OFFICE

| NAME | USER ID | ROLE | ID |
| --- | --- | --- | --- |
| John Matrix | Delta_Commando | Supervisor | 7173849573 |
| Ben Richards | Running_Man | Administrator | 1920472530 |
| Alan Schaefer | Dutch | Office Manager | 6183523438 |
| Douglas Quaid | Hauser | Temp | 7283834648 |

802

804

SYSTEMS AND METHODS FOR STATE MACHINE MANAGEMENT

PRIORITY APPLICATION

This application is a continuation of U.S. patent application Ser. No. 15/097,842, filed Apr. 13, 2016, which claims priority to U.S. Provisional Application Ser. No. 62/161,746, filed May 14, 2015, the disclosure of which are incorporated herein in their entirety by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, PALANTIR, INC, All Rights Reserved.

TECHNICAL FIELD

The subject matter disclosed herein generally relates to the creation and management of case data objects with a networked system. Specifically, the present disclosure addresses systems and methods for case generation and management.

BACKGROUND

Data processing systems can be used to facilitate the creation and management of virtual documents through a networked system, through the simultaneous management of a wide array of data objects from a variety of sources, where each data object may have unique management or workflow requirements. In turn, this management may ultimately lead to innovative applications with practical real-world applications. For example, an organization may automate a document creation process by configuring a data processing system to perform various workflow processes.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
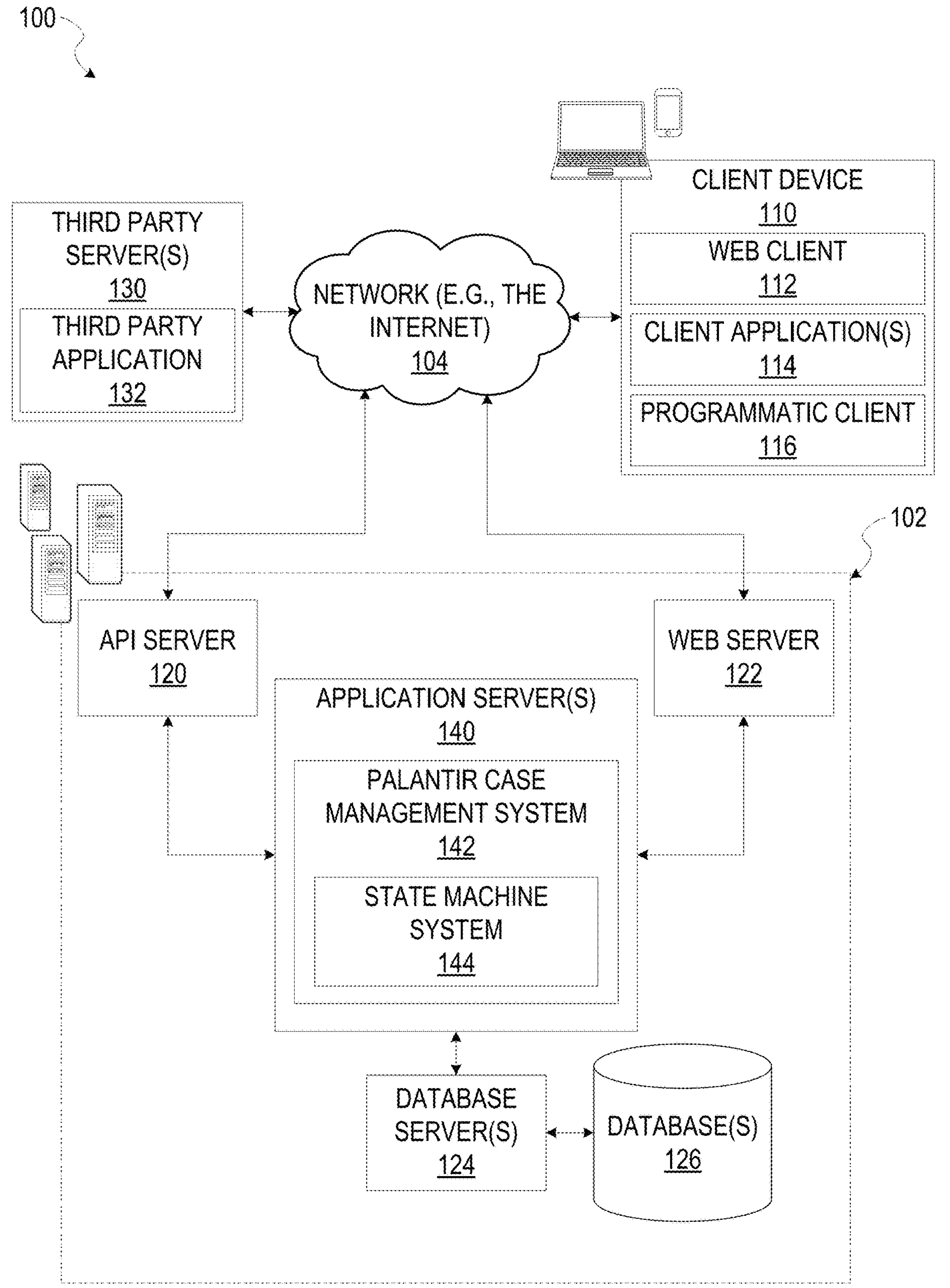
FIG. 1 is a network diagram illustrating a network architecture suitable for generating and managing cases, according to some example embodiments.

Example methods and systems are directed to a case management system configured to generate and manage case data objects. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A case management system is configured (e.g., by suitable modules) to provide one or more case generation and management functions. As configured, the case management system enables a user (e.g., a system developer) to generate and configure a state machine, the configuration of the state machine including one or more workflow states, one or more operations which may be performed at each of the one or more states, a set of transitions corresponding to the one or more operations, and an initial state. The state machine operationally provides a workflow for a case data object based on the corresponding configuration, wherein the case data object includes the configuration of the state machine.

The case management system is configured to access the state machine, and based on the corresponding configuration of the state machine, generate a case data object. Example embodiments also provide methods to receive (and assign to the case data object) a list of user identifiers, define user roles and access control lists (ACLs) for the users associated with the user identifiers, quickly add or view case notes, link associated elements to the generated cases, and track and record a lifecycle (e.g., chronology) of a case data object through the defined workflow.

As an illustrative example from a user perspective, suppose a user accesses the case management system through a client device. The case management system enables the user to access a state machine with a corresponding workflow configuration. The user may access the state machine by submitting a workflow identifier (e.g., a reference name corresponding to the workflow of the state machine), progress through the one or more states corresponding to the workflow as defined by the system developer (e.g., a creation/draft state, an approval state, a pending state), and execute developer defined operations which may be performed at each of the one or more states (e.g., drafting, editing, linking related documents, approval, rejection, assignment, transfer, cancellation). The state machine is therefore preconfigured (e.g., by the system developer) to include the workflow definitions that are then accessible by the user.

The user may decide to open a case (e.g., a case data object) based on the workflow previously defined and associated with the state machine. The user accesses the state machine by providing the corresponding workflow identifier (e.g., associated with the state machine) through the creation of a case in the frontend (e.g., selecting a "new case" icon within a graphical user interface). The user may additionally provide the case management system with one or more case properties (e.g., a case name) in order to open and generate the case, and the case management system will generate the case based on the state machine specified by the user. The case management system applies the one or more workflow definitions of the corresponding state machine to the case, thus defining the workflow for the case. Operations corresponding to the workflow previously defined by the system developer in the state machine may then be performed on the case based on a current state of the case. Subsequent states of the case are determined based on the transition definitions within the configuration of the state machine. In this way, the system developer may define a workflow to apply to cases generated by the case management system, and further allows users to open and manage cases through their corresponding workflow based on the state machine configurations previously provided by the system developer.

With reference to FIG. 1, an example embodiment of a high-level client-server-based network architecture 100 is shown. A network 104 provides server-side functionality to a client device 110. In some implementations, a user interacts with a networked system 102 using the client device 110. FIG. 1 illustrates, for example, a web client 112 (e.g., a browser, such as the INTERNET EXPLORER® browser developed by MICROSOFT® CORPORATION of Redmond, Washington State), client application(s) 114, and a programmatic client 116 executing on the client device 110. The client device 110 may include the web client 112, the client application(s) 114, and the programmatic client 116 alone, together, or in any suitable combination. Although FIG. 1 shows one client device 110, in other implementations, the network architecture 100 comprises multiple client devices.

The client device 110 may be a computing device that includes at least a display and communication capabilities that provide access to the network 104. The client device 110 may, for example, be a remote device, workstation, computer, general purpose computer, Internet appliance, handheld device, wireless device, portable device, wearable computer, cellular or mobile phone, Personal Digital Assistant (PDA), smartphone, tablet, ultrabook, netbook, laptop, desktop, multi-processor system, microprocessor-based or programmable consumer electronic system, game console, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 may comprise an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various example embodiments, the user may be a person, a machine, or other entity that is capable of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the network 104. The user can interact with the networked system 102 using the client device 110. Additionally, a third party application 132, executing on a third party server 130, is shown as having programmatic access to the networked system 102.

Further, while the network architecture 100 shown in FIG. 1 employs a client-server architecture, the present inventive subject matter is, of course, not limited to such an architecture, and may equally well find application in a distributed, or peer-to-peer, architecture system, for example. The systems of the applications server(s) 140 (e.g., the PaCMan System 142, and the state machine system144) may also be implemented as standalone software programs, which do not necessarily have networking capabilities.

Figure 2A:
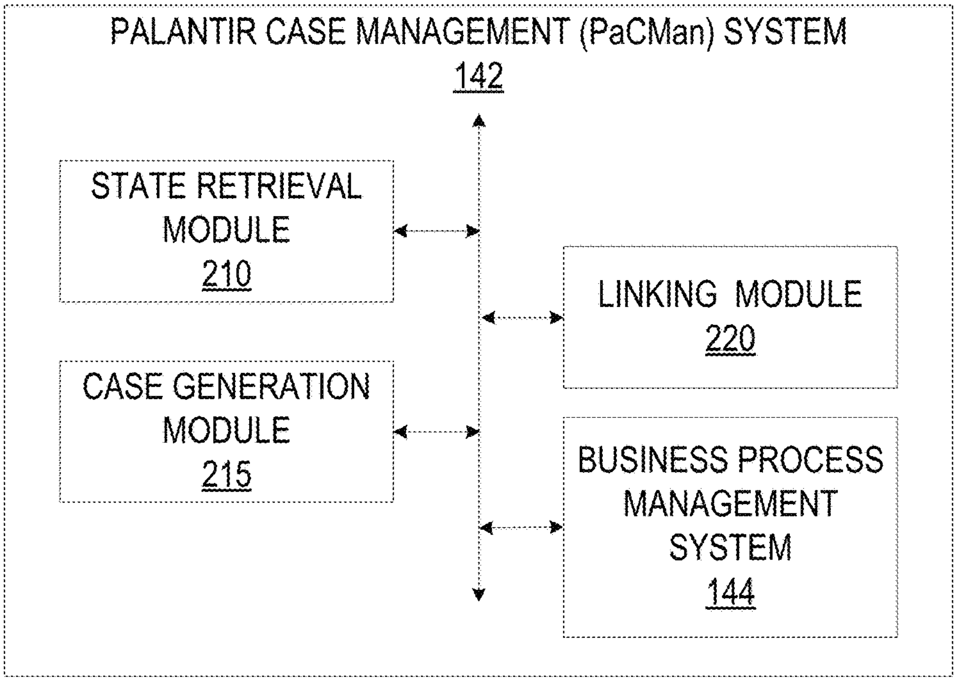
FIG. 2A is a block diagram illustrating an example embodiment of various modules forming a case management system, according to some example embodiments, which is provided as part of the network architecture of FIG. 1.

FIG. 2A is a block diagram illustrating components of the PaCMan system 142 that configure the PaCMan system 142 to generate and manage cases based on state machines generated by the state machine system144, according to some example embodiments. The PaCMan system 142 is shown as including a state retrieval module 210, a case generation module 215, a linking module 220, and the state machine system144, all configured to communicate with each other (e.g., via a bus, shared memory, or a switch). Any one or more of these modules may be implemented using one or more processors (e.g., by configuring the one or more processors to perform functions described for that module) and hence may include one or more of the processors.

Figure 2B:
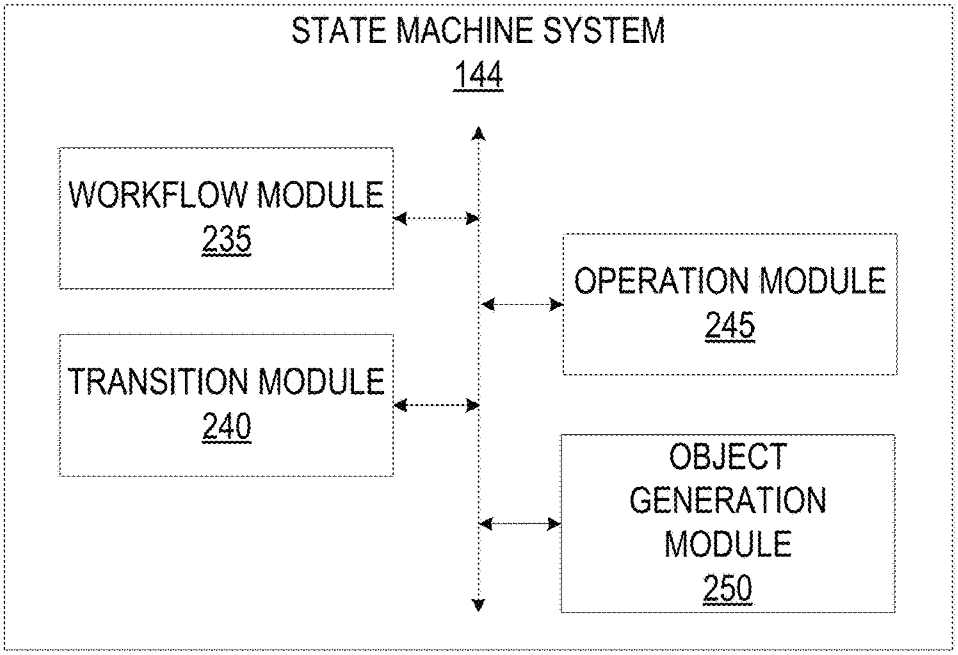
FIG. 2B is a block diagram illustrating an example embodiment of various modules forming a State Machine System, according to some example embodiments, which is provided as part of the network architecture of FIG. 1.

FIG. 2B is a block diagram illustrating components of the state machine system144 that configure the state machine system144 to create state machine based on provided workflow configurations, according to some example embodiments. The state machine system144 is shown as including a workflow module 235, a transition module 240, an operation module 245, and an object generation module 250, all configured to communicate with each other (e.g., via a bus, shared memory, or a switch). Any one or more of these modules may be implemented using one or more processors (e.g., by configuring the one or more processors to perform functions described for that module) and hence may include one or more of the processors.

Any one or more of the modules described herein may be implemented using hardware alone (e.g., one or more processors of a machine) or a combination of hardware and software. For example, any described module of the PaCMan system 142 or the state machine system144 may physically include an arrangement of one or more processors (e.g., a subset of or among the one or more processors of the machine described below with reference to FIG. 9) configured to perform the operations described herein for that module. As another example, any module of the PaCMan system 142 and the state machine system144 may include software, hardware, or both, that configure an arrangement of one or more processors (e.g., among the one or more processors of the machine) to perform the operations described herein for that module. Accordingly, different modules of the PaCMan system 142 and the state machine system144 may include and configure different arrangements of such processors or a single arrangement of such processors at different points in time. Moreover, any two or more modules of the PaCMan system 142 and the state machine system144 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
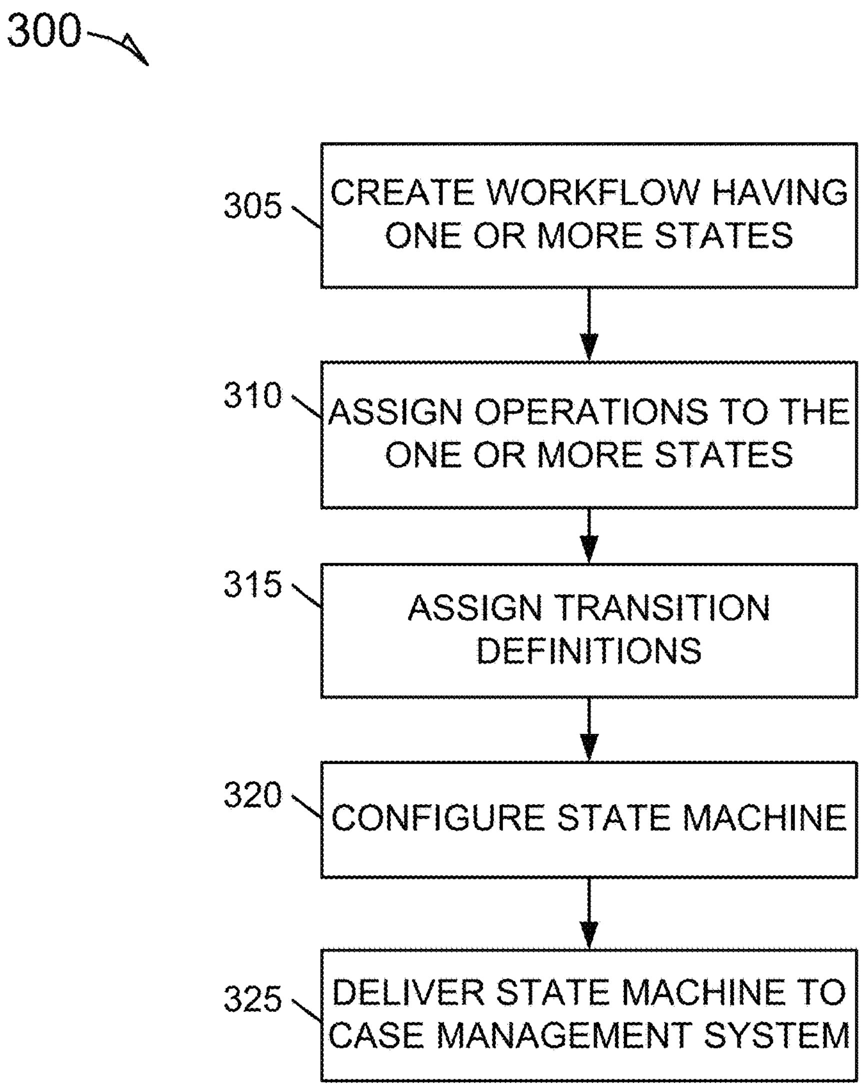
FIG. 3 is a flowchart illustrating operations of the state machine system in receiving workflow definitions, configuring a state machine, according to some example embodiments.

FIG. 3 is a flowchart illustrating operations of the state machine system144 in performing a method 300 of receiving a workflow configuration and generating and configuring state machines, according to some example embodiments. As shown in FIG. 3, some example embodiments of the method 300 may be performed by the state machine system144 using the modules described above with respect to FIG. 2B. FIG. 3 shows the method 300 including one or more of operations 305, 310, 315, 320, and 325.

Operation 305 may be performed by the workflow module 235, and with respect to the client device 110. The workflow module 235 receives a configuration of a state machine that defines a workflow of a corresponding case data object. For example, the workflow of the case data object (e.g., case, document) includes one or more workflow states, including for example states corresponding to a document creation phase (e.g., draft), an editing phase, a review phase, a pending approval phase, and an approved phase. The workflow module 235 is therefore configured to receive inputs from the client device 110 providing a number of workflow states corresponding to a document, and workflow state identifiers corresponding to each of the workflow states.

Operation 310 may be performed by the operation module 245, with respect to the client device 110. The operation module 245 receives operation definitions, which define operations that may be performed at each of the workflow states defined in operation 305. An operation may, for example, be an action or procedure which produces an outcome. An example outcome is moving a document from a current state to a subsequent state, or generating a notification in response to a performed operation. For example, the operation module 245 may receive multiple operation definitions (e.g., submitting a document for approval, approving a document, rejecting a document, assigning a document, transferring a document) corresponding to each of the workflow state definitions received by the workflow module 235 in operation 305. The operation module 245 tracks the execution of operations executed at each of the workflow states, and records the executed operations in a workflow chronology. The workflow chronology may include data indicating a time and date of execution, and a corresponding user identifier of a user who executed the operation.

Operation 315 may be performed by the transition module 240, with respect to the client device 110. The transition module 240 receives transition definitions, which define a sequence corresponding to the one or more workflow states based on operations performed. For example, a user (e.g., a system developer) may provide the transition module 240 with transition definitions, each incision definition establishes a subsequent workflow state of a document through the workflow based on an operation performed at the current state of the document within the workflow.

Operation 320 may be performed by the object generation module 250. The object generation module 250 retrieves the workflow definitions from the workflow module 235, the transition definitions from the transition module 240, and the operation definitions from the operation module 245. Upon retrieving the definitions, the object generation module generates and configures a state machine to assign the definitions to. In some example embodiments, the object generation module 250 may also receive a workflow identifier to assign to the state machine. At operation 325, the state machine system144 delivers the configured state machine to the PaCMan system 142.

Figure 4:
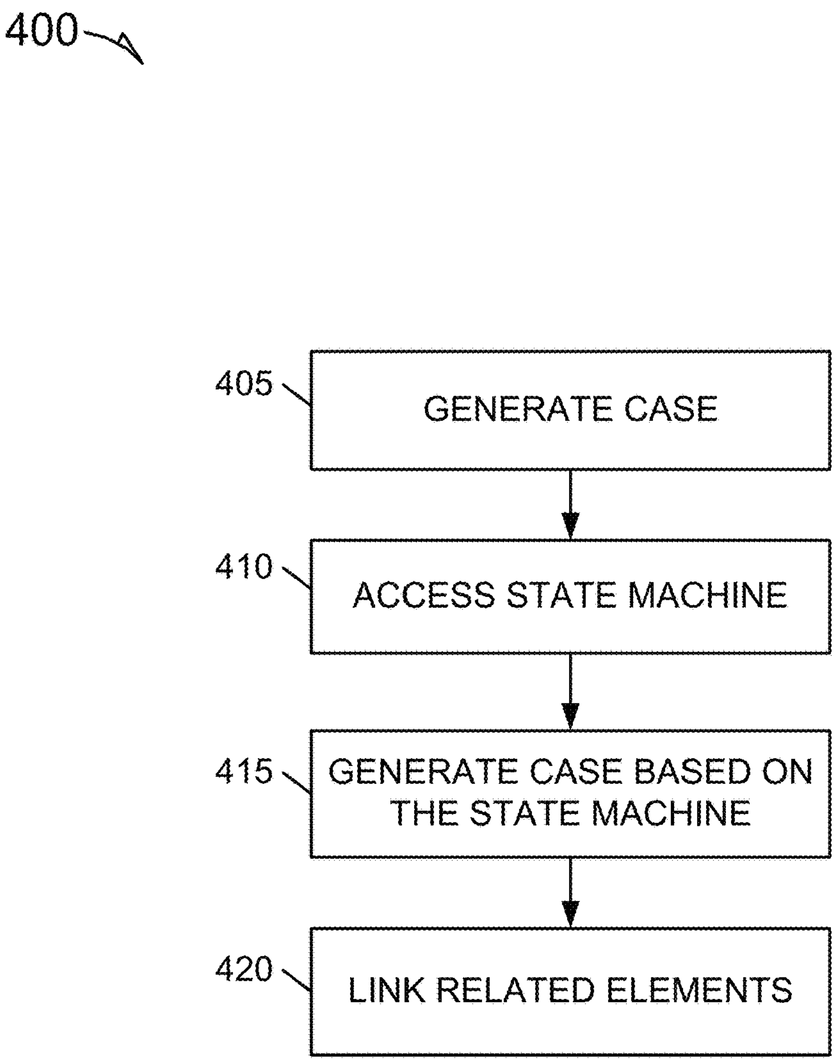
FIG. 4 is a flowchart illustrating operations of the PaCMan system in generating case data objects, accessing a state machine, and assigning the workflow configuration of the state machine the case data objects, according to some example embodiments.

FIG. 4 is a flowchart illustrating operations of the PaCMan system 142 in performing a method 400 of generating case data objects (e.g., cases), accessing the state machine related to the cases, and managing the cases based on the corresponding workflow definitions. As show in FIG. 4, some example embodiments of the method 400 may be performed by the PaCMan system 142 using modules described above with respect to FIG. 2A. FIG. 4 shows the method 400 including one or more of operations 405, 410, 415, and 420. The method 400 is merely a non-limiting example of a method for generating a case. Although the method steps are shown in a particular order, from operation 405 to operation 420, a person of ordinary skill in the art will understand that any system configured to perform the method steps, in any order, is within the scope of the present disclosure.

Operation 405 may be performed by the case generation module 215 of the PaCMan system 142. The case generation module 215 creates a case that includes a case identifier and one or more case properties (e.g., name of the case, content of the case, a subject, an author).

Operation 410 may be performed by the BPM retrieval module 210 of the PaCMan system 142. The state retrieval module 210 retrieves a set of workflow states by accessing the state machine system144. For example, the state retrieval module 210 may receive a workflow identifier from the client device 110, and the workflow identifier corresponding to a state machine with a particular configuration corresponding to the workflow identifier. The state machine system144 may provide the state retrieval module 210 with access to the appropriate state machine, based on the workflow identifier received.

Operation 415 may be performed by the case generation module 215. The case generation module 215 receives a command from the client device 110, where the command includes the workflow identifier. The case generation module 215 assigns the workflow of the state machine identified by the workflow identifier to the case. Assigning the workflow of the state machine to the case applies the received workflow configurations to the case.

Operation 420 may be performed by the linking module 220. The linking module 220 accesses the third party servers 130 through the network 104, or the one or more database(s) 126 through the one or more database server(s) 124, in order to retrieve any documents or elements which may be related to the case generated by the case generation module 215 in operation 405. The documents may be related based on the one or more case properties. The linking module 220 may then link the one or more associated elements to the case. By linking the one or more associated elements, the linking module 220 generates a reference to each of the one or more associated elements, and stores the reference within the case, such that the one or more associated elements may be retrieved based on their corresponding references. Alternatively, the linking module 220 may also generate a reference to the case, and assign the reference to the case to the one or more associated elements.

The linking module 220 retrieves a list of user identifiers corresponding to one or more users to assign to the case. The list of user identifiers may include names, contact information, user names, and the like. For example, the linking module 220 may retrieve the list of user identifiers from a database (e.g., database 126) based on a user selection or input. The linking module 220 also retrieves inputs defining user roles and access corresponding to the one or more users identified by the one or more user identifiers. The user roles may define operations which each user may perform upon the case during the one or more workflow states.

Figure 5:
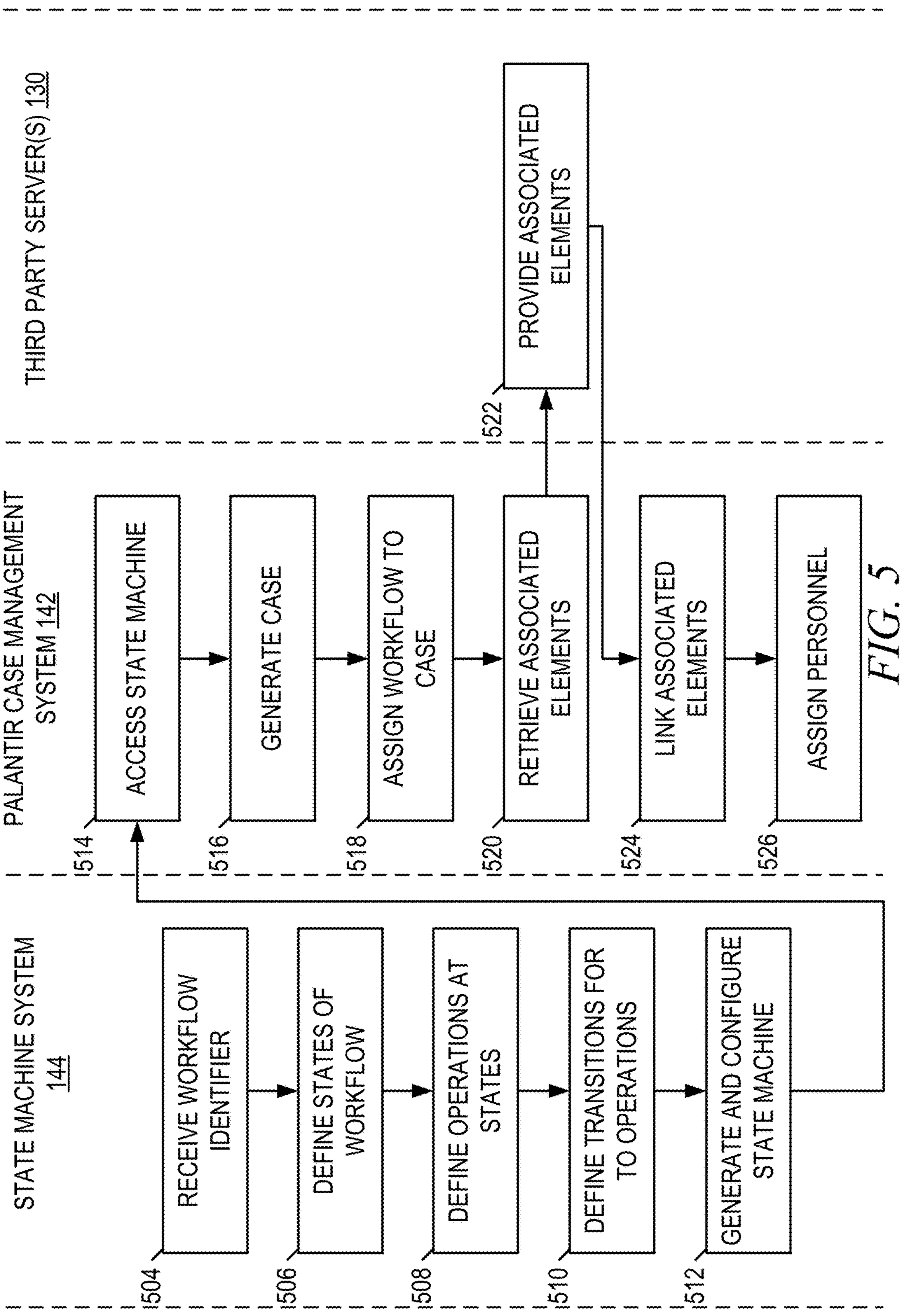
FIG. 5 is an interaction diagram illustrating various example interactions between the state machine system, the PaCMan system, and third party servers, consistent with some embodiments.

FIG. 5 is an interaction diagram depicting example exchanges between the state machine system144, the PacMan system 142, and the third party servers 130, consistent with some embodiments. At operation 504, the state machine system144 receives a workflow identifier (e.g., from a system developer) to assign to a workflow configuration of a state machine. In some instances, the inputs may be received via a graphical user interface (GUI) element at which a user inputs one or more data sources to retrieve documents.

Operations 504-512 take place within the state machine system144. At operation 506, workflow states and corresponding workflow identifiers for each of the workflow states are received. For example, a user (e.g., a system developer) may define that a workflow has four possible workflow states, where each of the four workflow states has a corresponding workflow state identifier (e.g., draft, approved, rejected, pending).

At operation 508, the state machine system144 receives definitions for operations which may be performed at each of the one or more workflow states. In some example embodiments, the operations may include assigning the case, editing the case, submitting the case for approval, approving the case, or rejecting the case. The definitions may limit what operations can be performed on a case depending on the state in which the case is in.

At operation 510, the state machine system144 receives transition definitions corresponding to the one or more workflow states, based on the one or more operation definitions received in operation 508. The transition definitions delineate a sequence of the workflow states for a case data object. For example, the transition definitions may provide that a subsequent workflow state of a case varies depending on the operation performed on the case in its current state.

At operation 512, the state machine system144 generates and configures a state machine based on the one or more workflow configurations (e.g., the workflow identifier, the workflow states, the workflow operations, and the transition definitions).

Operations 514-520, and 524-526, take place within the PaCMan system 142. At operation 514, the PaCMan system 142 accesses the state machine generated by the state machine system144. For example, the PaCMan system 142 may access the state machine by providing the state machine system144 with a workflow identifier corresponding to a workflow of the state machine generated and configured by the state machine system144. In some example embodiments, the PaCMan system 142 may also access multiple state machines previously generated and configured by the state machine system144, and enable the user to select a desired workflow based on a workflow identifier.

At operation 516, the PaCMan system 142 receives case properties and a case identifier from the client device 110, and generates a case data object based on the one or more case properties. At operation 518, the PaCMan system 142 assigns the retrieved workflow configuration from the accessed state machine to the generated case. Once the workflow configuration has been assigned to the generated case, the case receives the one or more workflow definitions of the corresponding state machine. In doing so, the PaCMan system 142 enables a user to manage the case through one or more corresponding workflow states, based on the workflow configurations of the corresponding state machine.

At operation 520, the PaCMan system 142 retrieves one or more elements associated with the case, based on the one or more workflow properties, from the third party servers 130. In some embodiments, the PaCMan system 142 may also retrieve elements associated with the case from the databases 126. At operation 522, the third party server 130 provides the PaCMan system 142 with the associated elements, and at operation 524, the PaCMan system 142 links the associated elements to the case, as was discussed above with reference to FIG. 4. In some example embodiments, the links between the case and the one or more elements are correlated by the user.

At operation 526, the PaCMan system 142 receives a list of one or more user identifiers identifying one or more users to whom to assign the case. Assigning the case associates the case with the one or more user identifiers. In some embodiments, a user may be designated as an author of the case, or an administrator, such that the designation grants the user greater access and operation privileges within the one or more workflow states of the case.

Figure 6:
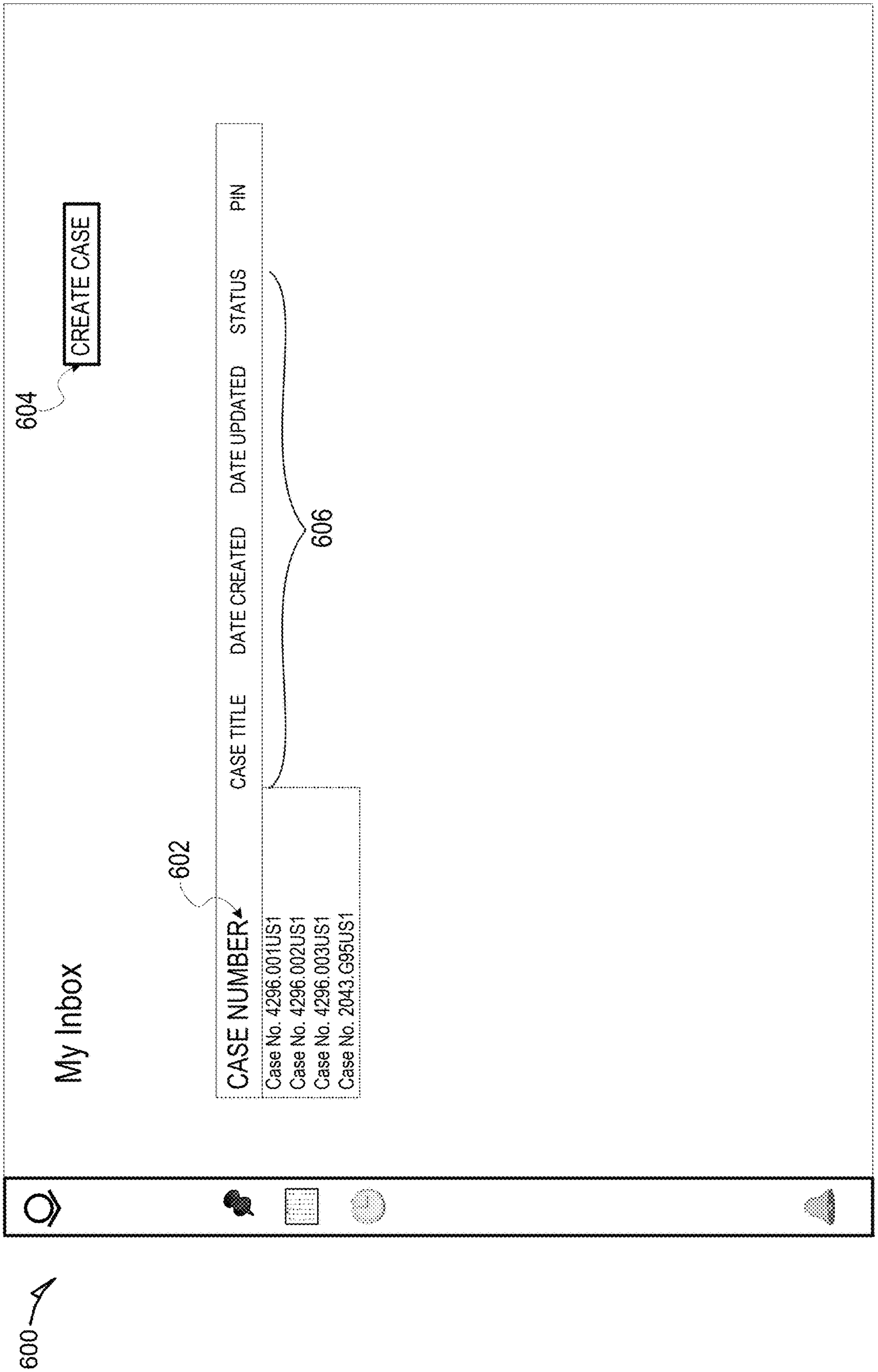
FIG. 6 is a diagram illustrating a document inbox of the PaCMan system, including sorting criteria, a case creation icon, and a case search field, according to some example embodiments.

FIG. 6 is a user interface diagram showing a document inbox 600 of the PaCMan system 142, having a case search field 602, a case creation icon 604, and one or more sorting criteria 606. The document inbox 600 may be an interactive webpage or an interactive application screen that allows the user (e.g., Adam) to generate and manage cases.

The case search field 602 is shown as a text based input field configured to receive one or more case identifiers from the client device 110. For example, the user may provide the case search field 602 with a case identifier corresponding to a case which has been previously generated by the case generation module 215. In some embodiments, the case search field 602 may be configured to expand to display a list of case identifiers corresponding to cases which have previously been generated, enabling the user may select a case to access through the case search field 602. Shown adjacent to the case search field 602 are the one or more sorting criteria 606. In some embodiments, the PaCMan system 142 may be configured to sort the previously generated cases based on sorting criteria which may include a title, a date created, a date updated, or a status within the workflow corresponding to the case.

Selection of the case creation icon 604 may result in the presentation of a case creation interface, enabling the user to provide one or more case properties and assign a workflow configuration of a state machine to govern the workflow of the case.

Figure 7:
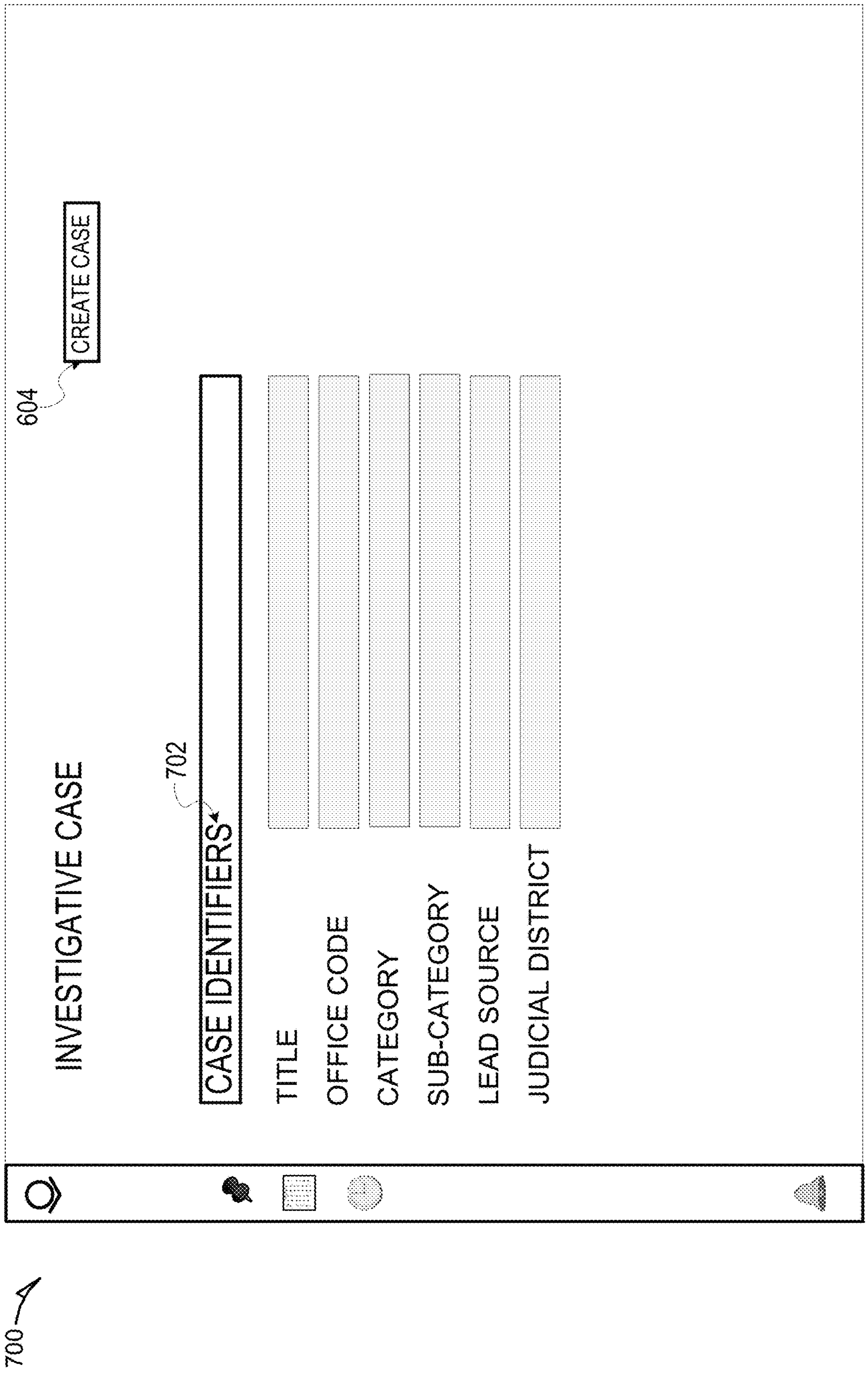
FIG. 7 is a diagram illustrating a case creation interface of the PaCMan system, according to some example embodiments.

FIG. 7 is a diagram of a case creation interface 700 of the PaCMan system 142, shown to include one or more case properties 702, and access control list inputs 704. By selecting the case creation icon 604 as shown in FIG. 6, the PaCMan system 142 causes the display of the case creation interface 700. The user may then provide the PaCMan system 142 with the one or more case properties 702. In some example embodiments, the user may enter the one or more case properties 702 as text-based inputs. Alternatively, the case creation interface 700 may be configured to present a list of one or more case properties which a user may select from among.

Figure 8:
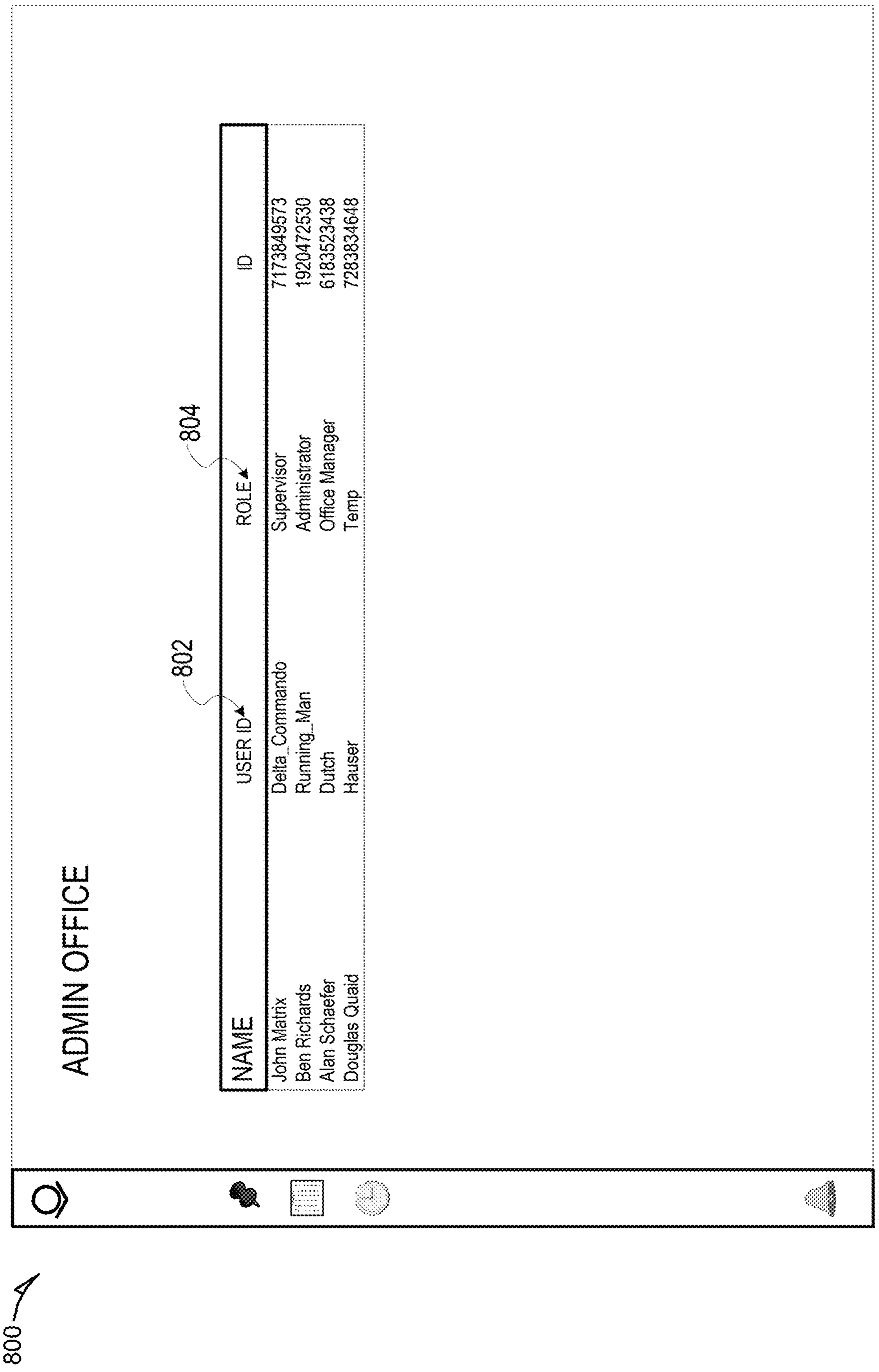
FIG. 8 is a diagram illustrating a user role and access interface of the PaCMan system, according to some example embodiments.

FIG. 8 is a diagram of a user role and access interface 800, shown to include a user identification field 802 and a user role field 804. The user identification field 802 is operable to receive one or more user identifiers corresponding to users associated with a case generated by the PaCMan system 142, and the user role field 804 is operable to receive user roles of each of the one or more user identifiers received in the user identification field 802. A user identifier (among the one or more user identifiers) may have one or more corresponding roles.

Figure 9:
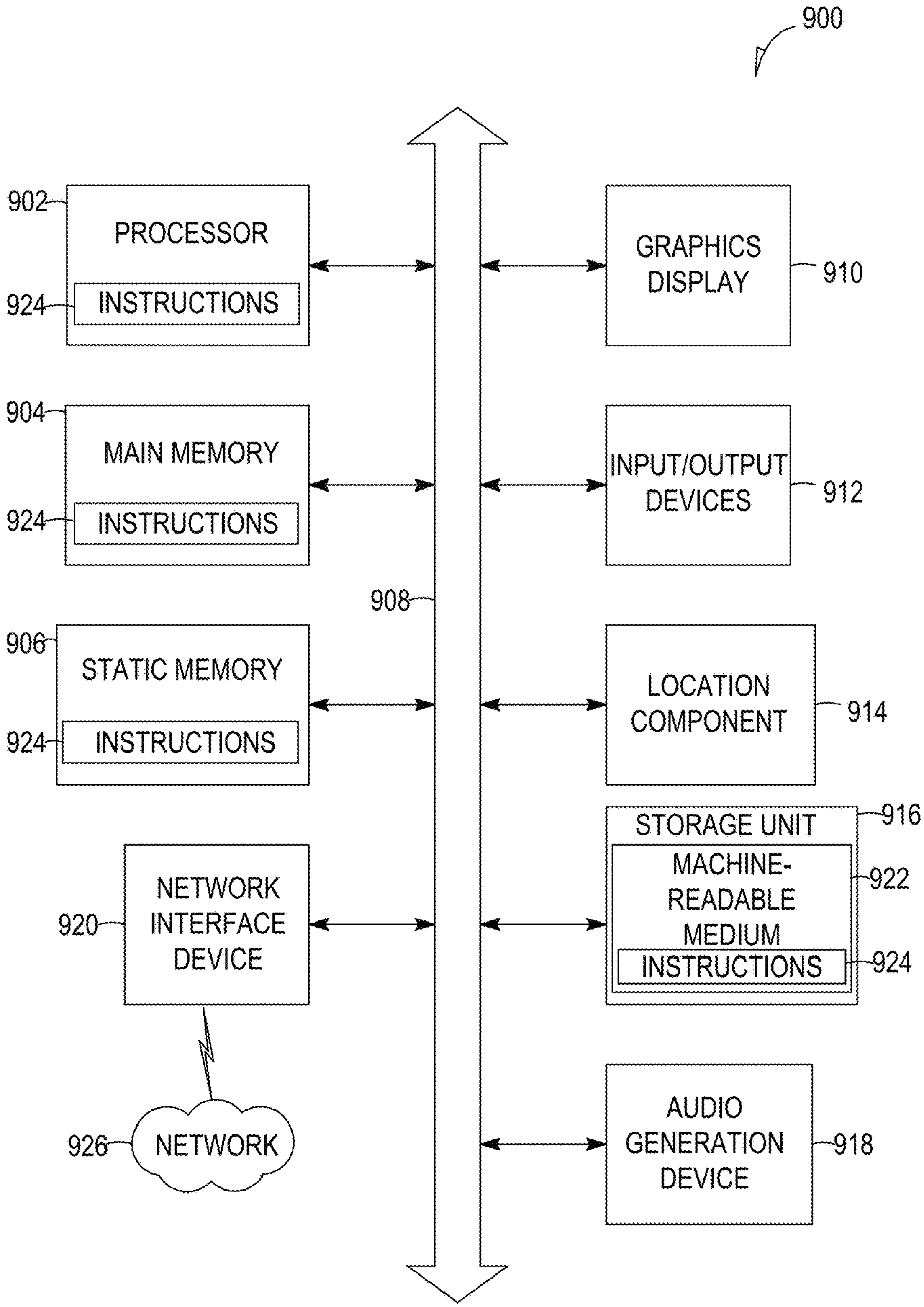
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be communicatively coupled (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a PC, a tablet computer, a laptop computer, a netbook, a cellular telephone, a smartphone, a set-top box (STB), a PDA, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain solid-state digital microcircuits (e.g., electronic, optical, or both) that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein. In some example embodiments, the processor 902 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 900 with at least the processor 902, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an input/output device 912 (e.g., a keyboard or keypad, mouse, or trackpad), a location component 914 (e.g., a GPS receiver), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), within the static memory 906, or any combination thereof, before or during execution thereof by the machine 900. Accordingly, the main memory 904, the static memory 906, and the processor 902 may be considered machine-readable media (e.g., tangible and non-transitory machine-readable media). The instructions 924 may be transmitted or received over a network 926 via the network interface device 920. For example, the network interface device 920 may communicate the instructions 924 using any one or more transfer protocols (e.g., hypertext transfer protocol (HTTP)).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., the processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 924 for execution by the machine 900 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 924).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A method comprising:
- generating a state machine for a workflow for a case data object;
- assigning a set of transition definitions to the state machine;
- assigning a set of workflow identifiers to the state machine, each of the workflow identifiers corresponding to a respective workflow state of a set of workflow states;
- based on a detection of a specification of a first workflow identifier of the set of workflow identifiers,
  - generating the case data object, the case data object including one or more case properties, the one or more case properties including content of a case; and
  - associating the case data object with a first workflow state of the set of workflow states, the associating of the case data object with the first workflow state including limiting the user to a set of operations performable by the user while the state machine is in the first workflow state;
- selecting one or more elements associated with the case data object based at least in part on at least one of the one or more case properties, wherein at least one of the one or more elements is a document;
- generating a reference to each element of the one or more associated elements;
- storing the reference in the case data object; and
- based on a detection of a selection of an operation from the set of operations,
  - causing the selected operation to be executed, the causing of the selected operation to be executed including causing a transitioning of the state machine from the first workflow state to a second workflow state of the set of workflow states, the transitioning based on the set of transition definitions; and
  - associating the case data object with the second workflow state of the set of workflow states.

2. The method of claim 1, further comprising:
- receiving a case identifier;
- assigning the case identifier to the case data object, the case identifier identifying the case data object.

3. The method of claim 1, wherein the one or more case properties include a list of user identifiers, wherein the list of user identifiers indicates a list of users assigned to the case data object.

4. The method of claim 1, further including:
- receiving the first workflow identifier as an input from a client device; and
- retrieving the state machine based on the workflow identifier.

5. The method of claim 1, further comprising: receiving a list of user identifiers representing one or more users;
- assigning the list of user identifiers to the case data object; and
- assigning a role to each user identifier among the list of user identifiers, the role defining access privileges of each user with respect to the case data object.

6. The method of claim 1, further comprising:
- tracking the execution of the selected operation; and
- recording the execution of the selected operation in a workflow chronology, the workflow chronology including one or more executed workflow operations.

7. The method of claim 3, further comprising: accessing a plurality of data sources; and
- retrieving the one or more associated elements from the plurality of data sources based on the one or more case properties.

8. A system comprising:
- one or more processors;
- one or more memories; and
- a set of instructions stored in the one or more memories, the set of instructions configuring the one or more processors to perform operations comprising:
  - generating a state machine for a workflow for a case data object;
  - assigning a set of transition definitions to the state machine;
  - assigning a set of workflow identifiers to the state machine, each of the workflow identifiers corresponding to a respective workflow state of a set of workflow states;
  - based on a detection of a specification of a first workflow identifier of the set of workflow identifiers,
    - generating the case data object, the case data object including one or more case properties, the one or more case properties including content of a case; and
    - associating the case data object with a first workflow state of the set of workflow states, the associating of the case data object with the first workflow state including limiting the user to a set of operations performable by the user while the state machine is in the first workflow state;
  - selecting one or more elements associated with the case data object based at least in part on at least one of the one or more case properties, wherein at least one of the one or more elements is a document;
  - generating a reference to each element of the one or more associated elements;
  - storing the reference in the case data object; and
  - based on a detection of a selection of an operation from the set of operations, causing the selected operation to be executed, the causing of the selected operation to be executed including causing a transitioning of the state machine from the first workflow state to a second workflow state of the set of workflow states, the transitioning based on the set of transition definitions; and associating the case data object with the second workflow state of the set of workflow states.

9. The system of claim 8, wherein the operations further comprise:

receiving a case identifier;

assigning the case identifier to the case data object, the case identifier identifying the case data object.

10. The system of claim 8, wherein the one or more case properties that include a list of user identifiers, wherein the list of user identifiers indicates a list of users assigned to the case data object.

11. The system of claim 8, the operations further comprising:

receiving the first workflow identifier as an input from a client device; and retrieving the state machine based on the workflow identifier.

12. The system of claim 8, the operations further comprising:

receiving a list of user identifiers representing one or more users;

assigning the list of user identifiers to the case data object; and assigning a role to each user identifier among the list of user identifiers, the role defining access privileges of each user with respect to the case data object.

13. A non-transitory machine-readable storage medium including instructions that, when executed by one or more processors, cause the one or more processors to perform operations including:

generating a state machine for a workflow for a case data object;

assigning a set of transition definitions to the state machine;

assigning a set of workflow identifiers to the state machine, each of the workflow identifiers corresponding to a different workflow state of a set of workflow states;

based on a detection of a specification of a first workflow identifier of the set of workflow identifiers, generating the case data object, the case data object including one or more case properties, the one or more case properties including content of a case; and associating the case data object with a first workflow state of the set of workflow states, the associating of the case data object with the first workflow state including limiting the user to a set of operations performable by the user while the state machine is in the first workflow state;

selecting one or more elements associated with the case data object based at least in part on at least one of the one or more case properties, wherein at least one of the one or more elements is a document;

generating a reference to each element of the one or more associated elements;

storing the reference in the case data object; and based on a detection of a selection of an operation from the set of operations, causing the selected operation to be executed, the causing of the selected operation to be executed including causing a transitioning of the state machine from the first workflow state to a second workflow state of the set of workflow states, the transitioning based on the set of transition definitions; and associating the case data object with the second workflow state of the set of workflow states.

14. The non-transitory machine-readable storage medium of claim 13, the operations further comprising:

receiving a case identifier;

assigning the case identifier to the case data object, the case identifier identifying the case data object.

15. The non-transitory machine-readable storage medium of claim 13, wherein the one or more case properties include a list of user identifiers, wherein the list of user identifiers indicates a list of users assigned to the case data object.

* * * * *